(12) United States Patent
Yokoyama et al.

(10) Patent No.: US 9,074,022 B2
(45) Date of Patent: *Jul. 7, 2015

(54) PROCESS FOR PRODUCTION OF WATER-ABSORBENT RESIN

(75) Inventors: Hideki Yokoyama, Himeji (JP); Yasuhiro Nawata, Himeji (JP)

(73) Assignee: SUMITOMO SEIKA CHEMICALS CO., LTD., Hyogo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/298,195

(22) PCT Filed: Apr. 26, 2007

(86) PCT No.: PCT/JP2007/059066
§ 371 (c)(1),
(2), (4) Date: Oct. 23, 2008

(87) PCT Pub. No.: WO2007/126002
PCT Pub. Date: Nov. 8, 2007

(65) Prior Publication Data
US 2009/0182092 A1  Jul. 16, 2009

(30) Foreign Application Priority Data
Apr. 27, 2006  (JP) ................. 2006-124428

(51) Int. Cl.
*C08F 2/18* (2006.01)
*C08F 2/32* (2006.01)
*C08F 220/06* (2006.01)

(52) U.S. Cl.
CPC ... *C08F 2/18* (2013.01); *C08F 2/32* (2013.01); *C08F 220/06* (2013.01)

(58) Field of Classification Search
CPC ............... C08F 2/04; C08F 2/06; C08F 2/08; C08F 2/14; C08F 2/18; C08F 2/20; C08F 2/32; C08F 220/06; A61L 15/20; A61L 15/22; A61L 15/24
See application file for complete search history.

(56) References Cited

U.S. PATENT DOCUMENTS

| | | | | |
|---|---|---|---|---|
| 5,180,798 A * | 1/1993 | Nakamura et al. | ........... | 526/66 |
| 5,202,400 A | 4/1993 | Itoh et al. | | |
| 5,439,993 A | 8/1995 | Ito et al. | | |
| 5,652,309 A | 7/1997 | Itoh et al. | | |
| 5,795,926 A | 8/1998 | Niessner et al. | | |
| 6,254,990 B1 * | 7/2001 | Ishizaki et al. | ........... | 428/402 |
| 7,009,010 B2 | 3/2006 | Kanto et al. | | |
| 2003/0219600 A1 | 11/2003 | Mitchell et al. | | |
| 2004/0110913 A1 * | 6/2004 | Kanto et al. | ........... | 526/317.1 |
| 2007/0015887 A1 | 1/2007 | Yoshino et al. | | |
| 2009/0036855 A1 | 2/2009 | Wada et al. | | |
| 2009/0169891 A1 | 7/2009 | Higashimoto et al. | | |
| 2009/0182092 A1 | 7/2009 | Yokoyama et al. | | |
| 2009/0281247 A1 | 11/2009 | Handa et al. | | |
| 2010/0331802 A1 | 12/2010 | Yokoyama et al. | | |

FOREIGN PATENT DOCUMENTS

| | | |
|---|---|---|
| CN | 1053796 A | 8/1991 |
| CN | 1212257 A | 3/1999 |
| CN | 1492884 A | 4/2004 |
| EP | 0441507 A1 | 8/1991 |
| EP | 0751159 A2 | 1/1997 |
| EP | 0827753 A2 | 3/1998 |
| EP | 1623998 A1 | 2/2006 |
| EP | 1796831 A1 | 6/2007 |
| EP | 2014683 A1 | 1/2009 |
| EP | 2184300 A1 | 5/2010 |
| EP | 2599795 A1 | 6/2013 |
| EP | 2599796 A1 | 6/2013 |
| EP | 2599797 A1 | 6/2013 |
| JP | 58-179201 A | 10/1983 |
| JP | 59-11304 A | 1/1984 |
| JP | 61-087702 A | 5/1986 |
| JP | 62-172006 A | 7/1987 |
| JP | 3-76701 A | 4/1991 |
| JP | 3-195709 A | 8/1991 |
| JP | 03-195713 A | 8/1991 |

(Continued)

OTHER PUBLICATIONS

Notification of Transmittal of Translation of the International Preliminary Report on Patentability (Form PCT/IB/326) of the International Application No. PCT/JP2008/064588 mailed Mar. 18, 2010, with forms PCT/IB/338, PCT/IB/373, and PCT/ISA/237.*
Notification of Transmittal of Translation of the International Preliminary Report on Patentability (Form PCT/IB/338) of International Application No. PCT/JP2007/059066 mailed Nov. 27, 2008 with Forms PCT/IB/373 and PCT/ISA/237.
Supplemental European Search Report dated Mar. 2, 2010, issued in corresponding European Patent Application No. 07742502.
European Office Action dated Jul. 19, 2010, issued in corresponding European Patent Application No. 07742502.3.
International Search report of PCT/JP2007/059066, date of mailing Jun. 12, 2007.
Chinese Office Action dated Feb. 9, 2011, issued in corresponding Chinese Patent Application No. 200780023652.5.
Japanese Office Action dated Oct. 23, 2012, issued in corresponding Japanese patent application No. 2008-513261, English translation Only (4 pages).

(Continued)

*Primary Examiner* — Robert C Boyle
*Assistant Examiner* — Stephen Rieth
(74) *Attorney, Agent, or Firm* — Westerman, Hattori, Daniels & Adrian, LLP

(57) ABSTRACT

A purpose of the present invention is to reduce odor of a water-absorbent resin during absorption of water. Such the invention is attained by a process for production of a water-absorbent resin by subjecting a water-soluble ethylenically unsaturated monomer to reversed-phase suspension polymerization. The process comprises the following steps (A) to (C): (A) adding an aqueous solution of water-soluble ethylenically unsaturated monomer to a petroleum hydrocarbon dispersion medium to disperse the aqueous solution in the dispersion medium; (B) adding a surfactant to the emulsion to further disperse the emulsion; and (C) performing the reversed-phase suspension polymerization using a water-soluble radical polymerization initiator, optionally in the presence of an internal-crosslinking agent.

4 Claims, No Drawings

(56) References Cited

FOREIGN PATENT DOCUMENTS

| JP | 9-012613 A | 1/1997 |
|---|---|---|
| JP | 9-077810 A | 3/1997 |
| JP | 9-143210 A | 6/1997 |
| JP | 2000-128907 A | 5/2000 |
| JP | 2006-068731 A | 3/2006 |
| JP | 2006-089525 A | 4/2006 |
| JP | 2006-342306 A | 12/2006 |
| WO | 03/051939 A1 | 6/2003 |
| WO | 2004/101628 A1 | 11/2004 |
| WO | 2005/012369 A1 | 2/2005 |
| WO | 2006/014031 A1 | 2/2006 |
| WO | 2007/123188 A1 | 11/2007 |
| WO | 2007/126002 A1 | 11/2007 |
| WO | 2009/025235 A1 | 2/2009 |

OTHER PUBLICATIONS

International Search Report of PCT/JP2008/064588, mailing date of Nov. 4, 2008.
Supplementary European Search Report Jan. 14, 2011, issued in corresponding European Patent Application No. 08792469.2.
Singapore Search Report dated Jan. 6, 2011, issued in corresponding Singapore Patent Application No. 201001124-5.
Chinese Office Action dated Sep. 21, 2011, issued in corresponding Chinese Patent Application No. 200880113420.3.
US Office Action dated Oct. 6, 2014, issued in U.S. Appl. No. 13/812,650 (8 pages).
International Search Report of PCT/JP2011/066454, mailing date of Sep. 13, 2011.
International Search Report for PCT/JP2011/066456, mailing date of Sep. 13, 2011.
Translation of the International Preliminary Report on Patentability (PCT/IB/338) (1 page), (PCT/IB/373) (1 page) of International Application No. PCT/JP2011/066453 mailed Mar. 21, 2013 (Form PCT/ISA/237) (6 page).
International Preliminary Report on Patentability (PCT/IB/326) (1 page), (PCT/IB/373) (1 page) of International Application No. PCT/JP2011/066453 mailed Feb. 7, 2013 (Form PCT/ISA/237) (3 pages) (Japanese Only).
Extended European Search Report dated Oct. 29, 2014, issued in corresponding European Patent Application No. 11812341.3 (8 pages).
Translation of the International Preliminary Report on Patentability (PCT/IB/338) (1 page), (PCT/IB/373) (1 page) of International Application No. PCT/JP2011/066454 mailed Mar. 21, 2013 (Form PCT/ISA/237) (4 page).
International Preliminary Report on Patentability (PCT/IB/326) (1 page), (PCT/IB/373) (1 page) of International Application No. PCT/JP2011/066454 mailed Feb. 7, 2013 (Form PCT/ISA/237) (3 pages) (Japanese Only).
Translation of the International Preliminary Report on Patentability (PCT/IB/338) (1 page), (PCT/IB/373) (1 page) of International Application No. PCT/JP2011/066455 mailed Mar. 21, 2013 (Form PCT/ISA/237) (4 page).
International Preliminary Report on Patentability (PCT/IB/326) (1 page), (PCT/IB/373) (1 page) of International Application No. PCT/JP2011/066455 mailed Feb. 7, 2013 (Form PCT/ISA/237) (3 pages) (Japanese Only).
Translation of the International Preliminary Report on Patentability (PCT/IB/338) (1 page), (PCT/IB/373) (1 page) of International Application No. PCT/JP2011/066456 mailed Mar. 21, 2013 (Form PCT/ISA/237) (4 page).
International Preliminary Report on Patentability (PCT/IB/326) (1 page), (PCT/IB/373) (1 page) of International Application No. PCT/JP2011/066456 mailed Feb. 7, 2013 (Form PCT/ISA/237) (3 pages) (Japanese Only).
US Office Action dated Apr. 9, 2013, issued in U.S. Appl. No. 13/812,695 (15 pages).
International Search Report of PCT/JP2011/066455, mailing date of Sep. 13, 2011.
International Search Report for PCT/JP2011/066453, mailing date of Aug. 16, 2011.
U.S. Non-Final Office Action dated Jun. 4, 2014, issued in related U.S. Appl. No. 14/100,331 (21 pages).
U.S. Non-Final Office Action dated Feb. 14, 2014, issued in related U.S. Appl. No. 13/812,612.
U.S. Non-Final Action dated Feb. 20, 2014, issued in related U.S. Appl. No. 13/812,753.
Extended European Search Report dated Oct. 29, 2014, issued in corresponding European Patent Application No. 11812340.5 (8 pages).
U.S. Office Action dated May 16, 2014, issued in corresponding U.S. Appl. No. 13/812,753 (17 pages).
U.S. Notice of Allowance dated Jul. 2, 2014, issued in related U.S. Appl. No. 13/812,612 (25 pages).
U.S. Notice of Allowance dated Jul. 7, 2014, issued in related U.S. Appl. No. 13/812,695 (13 pages).
U.S. Notice of Allowance dated Aug. 28, 2014, issued in related U.S. Appl. No. 13/812,753, (16 pages).
Search Report dated Dec. 8, 2014, issued in related Singaporean Patent Application No. 201300672-1 (8 pages).
Written Opinion dated Dec. 8, 2014, issued in related Singaporean Patent Application No. 201300672-1 (12 pages).
Extended European Search Report dated Jan. 13, 2015, issued in related European Patent Application No. 11812338.9 (8 pages).
U.S. Non-Final Office Action dated Dec. 26, 2014, issued in U.S. Appl. No. 13/812,650. (48 pages).
Taiwanese Office Action dated Dec. 6, 2012, issued in corresponding Taiwanese patent application No. 096114935.

* cited by examiner

PROCESS FOR PRODUCTION OF WATER-ABSORBENT RESIN

TECHNICAL FIELD

The present invention relates to a process for production of a water-absorbent resin, and a water-absorbent resin prepared thereby. More particularly, the present invention relates to a method for obtaining a water-absorbent resin with reduced odor in a process for production of a water-absorbent resin by reversed-phase suspension polymerization, and the water-absorbent resin prepared thereby.

BACKGROUND ART

Water-absorbent resins are widely used for hygienic materials such as disposable diapers and sanitary napkins, daily commodities such as pet sheets, and industrial materials such as water blocking materials for cables.

The hygienic materials such as disposable diapers and sanitary napkins generally comprise a top sheet, a back sheet, a hot melt adhesive, an elastic material, a water-absorbent resin, pulp fiber, and the like, and a number of synthetic resins and reforming agents are used therein. Thus the hygienic materials have some odor originating from the raw material components. Since these hygienic materials are worn on a human body, the odor makes those who wear them uncomfortable even if it is subtle, and therefore it is desired to develop an odor-free material.

Among the constituents of the hygienic materials, the water-absorbent resin has a subtle odor originating from the substances used in the production process, and since the odor tends to diffuse upon absorbing water, it is considered to be desirable to reduce the odor.

Known water-absorbent resins used for the hygienic materials include, for example, a partially-neutralized product of polyacrylic acid, a neutralized product of a starch-acrylic acid graft polymer, a hydrolysate of a starch-acrylonitrile graft copolymer, a saponified product of a vinyl acetate-acrylic acid ester copolymer, and the like.

As the process for production of such the water-absorbent resin, an aqueous polymerization method, a reversed-phase suspension polymerization method, and the like are known, but in the case of the water-absorbent resin prepared by the reversed-phase suspension polymerization method, in which polymerization is performed by suspending a water-soluble monomer in a dispersion medium, a major cause of the odor is considered to originate from the dispersion medium.

Known conventional arts for producing the water-absorbent resin by the reversed-phase suspension polymerization method include a method of polymerizing an $\alpha,\beta$-unsaturated carboxylic acid and the aqueous alkali metal salt solution thereof in a petroleum hydrocarbon solvent using a radical polymerization initiator in the presence/non-presence of a crosslinking agent, in which a sucrose fatty acid ester is used as a protective colloid agent (see Patent Document 1), and a method of polymerizing an $\alpha,\beta$-unsaturated carboxylic acid and a 25% by weight or higher aqueous alkali metal salt solution thereof in a petroleum hydrocarbon solvent using a radical polymerization initiator in the presence/non-presence of a crosslinking agent, in which a polyglycerol fatty acid ester with an HLB of 2-16 is used as a surfactant (see Patent Document 2), but these production technologies did not focus on reduction of odor, and thus the resultant water-absorbent resins were not those with low enough odor.

Patent Document 1:
  Japanese Unexamined Patent Publication (Kokai) No. 61-87702
Patent Document 2:
  Japanese Unexamined Patent Publication (Kokai) No. 62-172006

DISCLOSURE OF THE INVENTION

An object of the present invention is to provide a process for production of a water-absorbent resin in which odor upon absorbing water is reduced, and the water-absorbent resin prepared thereby.

Conventional reversed-phase suspension polymerization is performed by adding an aqueous monomer solution to a dispersion medium in which a surfactant is dissolved, followed by dispersing droplets of the aqueous monomer solution under stirring. However, the water-absorbent resin prepared by such the polymerization method had odor originating from the dispersion medium when it absorbed water.

Since a petroleum hydrocarbon with a boiling point of 80 to 130° C. is generally used as the dispersion medium in the production of the water-absorbent resin by a reversed-phase suspension polymerization method, it was considered that odor could be reduced by drying the resin at a high temperature higher than the boiling point of the dispersion medium. However, it was found that odor could not be reduced enough by a heat treatment.

The present inventors have studied the cause why the water-absorbent resin prepared by the reversed-phase suspension polymerization method failed in reducing odor by heating, and have found that a small amount of the dispersion medium is confined in the particles of the water-absorbent resin.

The present inventors have intensively studied how to prevent the dispersion medium from being confined in the particles of the water-absorbent resin, and have found that a water-absorbent resin with extremely low odor originating from the dispersion medium, when it absorbs water, is obtained by a reversed-phase suspension polymerization method comprising dispersing an aqueous monomer solution in a dispersion medium to which no surfactant has been added, adding a surfactant to the resultant emulsion to disperse the monomer further, and polymerizing, which led to the completion of the present invention.

That is, the present invention relates to a process for production of a water-absorbent resin by subjecting a water-soluble ethylenically unsaturated monomer to reversed-phase suspension polymerization, comprising the following steps of:

(A) adding an aqueous solution of water-soluble ethylenically unsaturated monomer to a petroleum hydrocarbon dispersion medium to disperse the aqueous solution in the dispersion medium,
(B) adding a surfactant to the emulsion to further disperse the monomer in the emulsion, and
(C) performing the reversed-phase suspension polymerization using a water-soluble radical polymerization initiator, optionally in the presence of an internal-crosslinking agent.

The process for production of present invention enables the production of a water-absorbent resin with extremely low odor when it absorbs water.

BEST MODE FOR CARRYING OUT THE INVENTION

In the process for production of the present invention, the first step is to add an aqueous solution of water-soluble ethylenically unsaturated monomer to a petroleum hydrocarbon dispersion medium to disperse the aqueous solution in the dispersion medium (step (A)).

Examples of the water-soluble ethylenically unsaturated monomer used in the present invention include monomers having an acid group, such as (meth)acrylic acid ["(meth)acrylic" denotes both "acrylic" and "methacrylic", and the same applies hereinafter], 2-(meth)acrylamide-2-methylpropanesulfonic acid and maleic acid and the salts thereof; nonionic unsaturated monomers such as (meth)acrylamide, N,N-dimethyl (meth)acrylamide, 2-hydroxyethyl (meth)acrylate and N-methylol (meth)acrylamide; and amino group-containing unsaturated monomers such as diethylaminoethyl (meth)acrylate and diethylaminopropyl (meth)acrylate, and the quaternarized compounds thereof. These compounds can be used alone or in combination by mixing 2 or more thereof.

Examples of the alkaline compound to be used at the time when the monomer having an acid group is neutralized to form a salt include lithium, sodium, potassium, ammonium compounds, and the like.

Preferred water-soluble ethylenically unsaturated monomers include (meth)acrylic acid and the salts thereof, and (meth)acrylamide, in view of industrial availability.

The monomer concentration of an aqueous solution of water-soluble ethylenically unsaturated monomer is from 20% by mass to the saturation concentration.

When the monomer having an acid group is neutralized, the preferred neutralization degree is from 30 to 90% by mol of the acid group in the water-soluble ethylenically unsaturated monomer. It is not preferred that the neutralization degree is lower than 30% by mol, because the acid group tends not to be ionized under the neutralization degree, and thus the water-absorption capacity becomes low. It is not preferred that the neutralization degree exceeds 90% by mol, because when the monomer is used for hygienic materials, there is a possibility that problems may occur in its safety and the like.

The aqueous solution of a water-soluble ethylenically unsaturated monomer may contain a chain transfer agent, thickener and the like, if it is needed.

Examples of the chain transfer agent include compounds such as thiols, thiol acids, secondary alcohols, hypophosphorous acid, phosphorous acid, and the like. These compounds can be used alone, or in combination of 2 or more thereof.

Examples of the thickener include carboxymethyl cellulose, hydroxyethyl cellulose, hydroxypropyl cellulose, methylcellulose, polyethylene glycol, polyacrylic acid, a neutralized product of polyacrylic acid, polyacrylamide, and the like.

Examples of the petroleum hydrocarbon used in the present invention as the dispersion medium for reversed-phase suspension polymerization include aliphatic hydrocarbons having 6 to 8 carbon atoms, such as n-hexane, n-heptane, 2-methylhexane, 3-methylhexane and n-octane; alicyclic hydrocarbons having 6 to 8 carbon atoms, such as cyclohexane, methyl cyclopentane and methyl cyclohexane; and aromatic hydrocarbons such as benzene, toluene and xylene.

Among these, it is preferred to use a dispersion medium selected from at least one of the aliphatic hydrocarbons or alicyclic hydrocarbons having 6 or 7 carbon atoms, or a mixture thereof, in view of industrial availability and cost.

The amount of the dispersion medium to be used is preferably from 50 to 600 parts by mass, more preferably from 50 to 400 parts by mass, and further preferably from 50 to 200 parts by mass, based on 100 parts by mass of the aqueous solution of water-soluble ethylenically unsaturated monomer, since the amount enables uniform dispersion of the aqueous solution of water-soluble ethylenically unsaturated monomer, and facilitates control of the polymerization temperature.

In the process for production of the present invention, a further preferred result is obtained when the aqueous solution of water-soluble ethylenically unsaturated monomer is added to and dispersed in the petroleum hydrocarbon dispersion medium in the presence of a polymeric dispersion agent.

It is preferred to select a polymeric dispersion agent which can be dissolved or dispersed in the above petroleum hydrocarbon dispersion medium as the polymeric dispersion agent used in the present invention, and that with an average molecular weight of 20,000 or less, preferably 10,000 or less, and more preferably 5,000 or less, is exemplified. Specific examples of the polymeric dispersion agent include maleic anhydride modified polyethylene, maleic anhydride modified polypropylene, maleic anhydride modified ethylene-propylene copolymer, maleic anhydride-ethylene copolymer, maleic anhydride-propylene copolymer, maleic anhydride-ethylene-propylene copolymer, polyethylene, polypropylene, ethylene-propylene copolymer, oxidized polyethylene, oxidized polypropylene, ethylene-acrylic acid copolymer, ethyl cellulose, ethylhydroxyethyl cellulose, anhydrous maleinated polybutadiene, anhydrous maleinated EPDM (ethylene/propylene/diene terpolymer), and the like.

Among these, it is preferred to use at least one selected from the group consisting of maleic anhydride modified polyethylene, maleic anhydride modified polypropylene, maleic anhydride modified ethylene-propylene copolymer, maleic anhydride-ethylene copolymer, maleic anhydride-propylene copolymer, maleic anhydride-ethylene-propylene copolymer, polyethylene, polypropylene, ethylene-propylene copolymer, oxidized polyethylene and oxidized polypropylene.

The amount of the polymeric dispersion agent to be used is preferably from 0 to 5 parts by mass, more preferably from 0.01 to 3 parts by mass, and further preferably from 0.05 to 2 parts by mass, based on 100 parts by mass of the aqueous solution of water-soluble ethylenically unsaturated monomer. It is not preferred that the amount of the polymeric dispersion agent to be added exceeds 5 parts by mass, since it is less economical.

In the process for production of the present invention, a surfactant is added to the emulsion prepared in the above step (A) to further disperse the aqueous solution of water-soluble ethylenically unsaturated monomer in the petroleum hydrocarbon dispersion medium (step (B)).

Examples of the surfactant used in the step (B) include nonionic surfactants such as sorbitan fatty acid ester, polyoxyethylene sorbitan fatty acid ester, polyglycerin fatty acid ester, polyoxyethylene glycerin fatty acid ester, sucrose fatty acid ester, sorbitol fatty acid ester, polyoxyethylene sorbitol fatty acid ester, polyoxyethylene alkyl ether, polyoxyethylene alkylphenyl ether, polyoxyethylene castor oil, polyoxyethylene hardened castor oil, alkylallyl formaldehyde condensed polyoxyethylene ether, polyoxyethylene polyoxypropylene alkyl ether, polyethylene glycol fatty acid ester, alkyl glucoside, N-alkyl gluconamide, polyoxyethylene fatty acid amide and polyoxyethylene alkylamine; and anionic surfactants such as fatty acid salts, alkylbenzene sulfonate, alkylmethyl taurate, polyoxyethylene alkylphenyl ether sulfate, polyoxyethylene alkyl ether sulfate, polyoxyethylene alkyl ether sulfonic acid and the salts thereof, polyoxyethylene alkylphenyl ether phosphoric acid and the salts thereof, and polyoxyethylene alkyl ether phosphoric acid and the salts thereof. The surfactants can be used alone or in combination of two or more thereof.

Among these surfactants, at least one selected from the group consisting of polyglycerin fatty acid ester, sucrose fatty acid ester and sorbitan fatty acid ester is preferred, in view of a dispersion stability of the aqueous solution of water-soluble ethylenically unsaturated monomer.

The amount of the surfactant to be used in the step (B) is preferably from 0.01 to 5 parts by mass, and more preferably from 0.05 to 3 parts by mass, based on 100 parts by mass of the aqueous solution of water-soluble ethylenically unsaturated monomer. It is not preferred that the amount of the surfactant to be added is less than 0.01 parts by mass, since the dispersion stability of the aqueous monomer solution becomes low, while it is not preferred that the amount exceeds 5 parts by mass since it is less economical.

The form of the surfactant to be added in the step (B) is not particularly limited, but it is preferred to use after diluting or dissolving the surfactant in a small amount of the dispersion medium thereby bringing about the dispersion stability in a short time.

Also, the above-mentioned polymeric dispersion agent may be added in the step (B), in addition to the surfactant.

When the polymeric dispersion agent is added together with the surfactant, the amount to be added thereof is preferably from 0 to 5 parts by mass, more preferably from 0.01 to 3 parts by mass, and further preferably from 0.05 to 2 parts by mass, based on 100 parts by mass of the aqueous solution of water-soluble ethylenically unsaturated monomer. It is not preferred that the amount of the polymeric dispersion agent to be added exceeds 5 parts by mass because it is less economical. It is also preferred to use the polymeric dispersion agent in a state that the dispersion agent has been dissolved or dispersed in a small amount of the dispersion medium under heat in advance thereby bringing about dispersion stability in a short time.

In the process for production of the present invention, the reversed-phase suspension polymerization is performed on the emulsion prepared in the above step (B) optionally in the presence of an internal-crosslinking agent, using a water-soluble radical polymerization initiator to obtain a water-absorbent resin (step (C)).

Examples of the water-soluble radical polymerization initiator include persulfates such as potassium persulfate, ammonium persulfate and sodium persulfate; peroxides such as hydrogen peroxide; and azo compounds such as 2,2'-azobis(2-amidinopropane) dihydrochloride, 2,2'-azobis[N-(2-carboxyethyl)-2-methylpropionediamine]tetrahydrate, 2,2'-azobis(1-imino-1-pyrrolidino-2-methylpropane) dihydrochloride and 2,2'-azobis[2-methyl-N-(2-hydroxyethyl)-propioneamide].

Among these, potassium persulfate, ammonium persulfate, sodium persulfate and 2,2'-azobis(2-amidinopropane) dihydrochloride are preferred, in view of availability and handling.

The water-soluble radical polymerization initiator may be used as a redox polymerization initiator together with a reducing agent such as sulfite and ascorbic acid.

The amount of the water-soluble radical polymerization initiator to be used is generally from 0.01 parts to 1 part by mass, based on 100 parts by mass of the water-soluble ethylenically unsaturated monomer. It is not preferred that the amount is less than 0.01 parts by mass, since the polymerization degree becomes low, while it is not preferred that it exceeds 1 part by mass, since an abrupt polymerization reaction occurs.

The timing when the water-soluble radical polymerization initiator is added is not particularly limited, but it is preferred to add the initiator in advance to the aqueous solution of water-soluble ethylenically unsaturated monomer.

Examples of the internal-crosslinking agent to be used, if it is needed, include polyols such as (poly)ethylene glycol [(poly) denotes both cases with and without the prefix of "poly", and the same applies hereinafter], 1,4-butanediol, glycerin and trimethylol propane; poly-unsaturated esters having 2 or more vinyl groups, prepared by reaction of polyols with unsaturated acids such as acrylic acid and methacrylic acid; bisacrylamides such as N,N'-methylenebisacrylamide; polyglycidyl compounds having 2 or more glycidyl groups such as (poly)ethylene glycol diglycidyl ether, (poly)ethylene glycol triglycidyl ether, (poly)glycerin diglycidyl ether, (poly)glycerin triglycidyl ether, (poly)propylene glycol polyglycidyl ether and (poly)glycerol polyglycidyl ether, and the like. These internal-crosslinking agents can be used alone or in combination of two or more thereof.

The amount of the internal-crosslinking agent to be added is preferably from 0 to 3 parts by mass, more preferably from 0 to 1 part by mass, and further preferably from 0.001 to 0.1 parts by mass, based on 100 parts by mass of the water-soluble ethylenically unsaturated monomer. It is not preferred that the amount to be added exceeds 3 parts by mass, since the crosslinkage is formed excessively and the water-absorption capacity declines too much.

It is preferred to use the internal-crosslinking agent in a way that it has been added to the aqueous solution of water-soluble ethylenically unsaturated monomer in advance.

The reaction temperature for performing the reversed-phase suspension polymerization cannot be determined generally in the present invention, since it varies depending on the kind and amount of the polymerization initiator to be used, but the temperature is preferably from 20 to 100° C., and more preferably from 40 to 90° C. It is not preferred that the reaction temperature is lower than 20° C., since the polymerization degree may decline, while it is not preferred that it exceeds 100° C., since an abrupt polymerization reaction occurs.

In the present invention, the reversed-phase suspension polymerization may be performed at the second stage, after adding the water-soluble ethylenically unsaturated monomer to the polymerization reaction suspension that completed the step (C). In the case where the reversed-phase suspension polymerization is performed in 2 stages, the polymerization reaction suspension is cooled until the surfactant reaches a precipitation state after completion of the first stage, and then the water-soluble ethylenically unsaturated monomer is added in the second stage to obtain particles in a form that the polymerized particles at the first stage are agglomerated. This is preferred because this method allows particles in a size suitable for an application to hygienic materials to be obtained.

The amount of the water-soluble ethylenically unsaturated monomer to be added at the second stage is preferably from 50 to 300 parts by mass, and more preferably from 100 to 200 parts by mass, based on 100 parts by mass of the water-soluble ethylenically unsaturated monomer at the first stage, in view of obtaining proper agglomerated particles.

Incidentally, when the reversed-phase suspension polymerization is performed in 2 stages, the above mentioned step (A) and step (B) are performed during the polymerization at the first stage.

In the present invention, a post-crosslinking reaction on a surface layer of the particles of the water-absorbent resin may be performed out by adding a post-crosslinking agent having 2 or more functional groups, which has reactivity to the functional groups originating from the water-soluble ethylenically unsaturated monomer, to the water-absorbent resin prepared in the steps (A) through (C) by the aforementioned method. The post-crosslinking on the particle surface layer of the water-absorbent resin enhances various performances such as water-absorption capacity under pressure, water-absorption rate and gel strength, and provides performances suitable for application to hygienic materials.

The post-crosslinking agent used for the post-crosslinking reaction is not particularly limited, as long as it is able to react with the functional groups originating from the water-soluble ethylenically unsaturated monomer used for the polymerization.

Examples of the post-crosslinking agent to be used include polyols such as ethylene glycol, propylene glycol, 1,4-butanediol, trimethylol propane, glycerin, polyoxyethylene glycol, polyoxypropylene glycol and polyglycerin; polyglycidyl compounds such as (poly)ethylene glycol diglycidyl ether, (poly)ethylene glycol triglycidyl ether, (poly)glycerin diglycidyl ether, (poly)glycerin triglycidyl ether, (poly)propylene glycol polyglycidyl ether and (poly)glycerol polyglycidyl ether; haloepoxy compounds such as epichlorohydrin, epibromohydrin and α-methylepichlorohydrin; compounds having 2 or more reactive functional groups such as isocyanate compounds including 2,4-tolylene diisocyanate and hexamethylene diisocyanate; oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol and 3-butyl-3-oxetane ethanol; oxazoline compounds such as 1,2-ethylenebisoxazoline; carbonate compounds such as ethylene carbonate. These post-crosslinking agents may be used alone or in combination of 2 or more thereof.

Among these, polyglycidyl compounds such as (poly)ethylene glycol diglycidyl ether, (poly)ethylene glycol triglycidyl ether, (poly)glycerin diglycidyl ether, (poly)glycerin triglycidyl ether, (poly)propylene glycol polyglycidyl ether and (poly)glycerol polyglycidyl ether are preferred, in view of excellent reactivity.

The amount of the post-crosslinking agent to be added is preferably from 0.01 to 5 parts by mass, and more preferably from 0.02 to 3 parts by mass, based on 100 parts by mass a total amount of the water-soluble ethylenically unsaturated monomer used for the polymerization.

It is not preferred that the amount of the post-crosslinking agent to be added is less than 0.01 parts by mass, since it fails to enhance various capacity such as the water-absorption capacity under pressure, water-absorption rate and gel strength of the resultant resin, while it is not preferred to exceed 5 parts by mass, since it results in excessively low water-absorption capacity.

When the post-crosslinking agent is added, it may be added as it is or in the form of an aqueous solution, or in the form of a solution dissolved in a hydrophilic organic solvent, if it is needed. Examples of the hydrophilic organic solvent include lower alcohols such as methyl alcohol, ethyl alcohol, n-propyl alcohol, isopropyl alcohol and propylene glycol; ketones such as acetone and methyl ethyl ketone; ethers such as diethyl ether, dioxane and tetrahydrofuran; amides such as N,N-dimethylformamide; sulfoxides such as dimethyl sulfoxide, and the like. These hydrophilic organic solvents may be used alone or in combination of 2 or more thereof.

The timing of adding the post-crosslinking agent is not particularly limited as long as it is added after completion of the polymerization. It is preferred that the post-crosslinking reaction is performed in a drying process after polymerization in the presence of water in a range of 1 part to 200 parts by mass, more preferably of 5 to 100 parts by mass, and most preferably of 10 to 50 parts by mass, based on 100 parts by mass of the water-absorbent resin. Thus, by adjusting the water content at the time of adding the post-crosslinking agent, post-crosslinkage is formed more properly on the particle surface layer of the water-absorbent resin, and excellent water-absorption capacity can be attained.

The temperature in the post-crosslinking reaction is preferably from 50 to 250° C., more preferably from 60 to 180° C., further preferably from 60 to 140° C., and most preferably from 70 to 120° C.

In the present invention, the drying process may be performed under ambient pressure or reduced pressure, or even under nitrogen atmosphere in order to enhance the drying procedure efficiency. When the drying process is performed under ambient pressure, the drying temperature is preferably from 70 to 250° C., more preferably from 80 to 180° C., further preferably from 80 to 140° C., and most preferably from 90 to 130° C. In the case of reduced pressure, the drying temperature is preferably from 60 to 100° C., and more preferably from 70 to 90° C.

The water content of the water-absorbent resin after drying is 20% or less, in view of providing fluidity, and preferably 10% or less in general.

The median particle size of the water-absorbent resin thus prepared is preferably from 10 to 300 μm, more preferably from 30 to 200 μm, and further preferably from 50 to 150 μm, when the reversed-phase suspension polymerization is performed in one stage. It is not preferred that the median particle size of the water-absorbent resin is 10 μm or less, since dust is generated when the water-absorbent resin is handled, while the median particle size of 300 μm or more is not preferred, since the suspension stability in the polymerization reaction may become low.

The shape of the water-absorbent resin thus prepared varies depending on the kind of surfactant or dispersion medium to be used, but generally is spherical or amorphous with lots of irregularities. It is preferred to apply the method described in the present application to the spherical particles, since it reduces odor originating from the dispersion medium effectively.

EXAMPLES

Next, the present invention will be described in detail below by way of Examples, but the present invention is not limited to the following Examples.

Example 1

92.0 g of 80% by weight acrylic acid was placed in a 500 mL Erlenmeyer flask, and 102.2 g of 30% by weight sodium hydroxide was added dropwise into the flask while externally cooling the flask thereby performing neutralization. 0.11 g of potassium persulfate, 8.3 mg of ethylene glycol diglycidyl ether and 43.6 g of ion-exchanged water were added thereto to prepare an aqueous solution of water-soluble ethylenically unsaturated monomer.

334 g of n-heptane as a petroleum hydrocarbon dispersion medium was placed in a 2 L five-neck cylindrical round bottom flask equipped with a stirrer, reflux condenser and nitrogen gas inlet tube and heated, to which all of the aqueous solution of water-soluble ethylenically unsaturated monomer was added using a funnel, and the mixture was stirred at an internal temperature of 40° C. for 10 minutes (step (A)).

Next, 0.92 g of sucrose fatty acid ester (Mitsubishi-Kagaku Foods Corp., trade name: S-370) as a surfactant was dissolved in 8.28 g of n-heptane under heat, which was placed in the above round bottom flask using a funnel thereby dispersing the aqueous solution of water-soluble ethylenically unsaturated monomer (step (B)).

Then, after the atmosphere inside the system was fully replaced with nitrogen gas while the internal temperature of the round bottom flask containing the above emulsion was retained at 40° C., the round bottom flask was then heated in a water bath at 70° C. for 1 hour thereby performing a polymerization reaction (step (C)).

After the polymerization reaction, the reaction product was heated in an oil bath at 120° C., and subjected to azeotropic distillation thereby removing 114 g of water off the system while refluxing n-heptane to obtain a dehydrated polymer.

Then, the polymer was heated in the oil bath at 120° C. to remove n-heptane and water off the system by distillation, and dried under a nitrogen atmosphere to obtain 93 g of a water-absorbent resin. The median particle size was 127 μm, the absorption capacity of physiological saline was 60 g/g, and the water content was 2% in the resultant water-absorbent resin.

Example 2

An aqueous solution of water-soluble ethylenically unsaturated monomer was prepared in the same manner as in Example 1.

334 g of n-heptane as a petroleum hydrocarbon dispersion medium was placed in a 2 L five-neck cylindrical round bottom flask equipped with a stirrer, reflux condenser and nitrogen gas inlet tube and heated, to which all of above the aqueous solution of water-soluble ethylenically unsaturated monomer was added using a funnel, and the mixture was stirred at an internal temperature of 40° C. for 10 minutes (step (A)).

Next, 0.92 g of sucrose fatty acid ester (Mitsubishi-Kagaku Foods Corp., trade name: S-370) as a surfactant was dissolved in 8.28 g of n-heptane under heat, 0.92 g of maleic anhydride modified polyethylene (Mitsui Chemicals Inc., trade name: Hiwax 1105A) as a polymeric dispersion agent was dissolved in 8.28 g of n-heptane under heat, and both solutions were added to the above round bottom flask using a funnel thereby dispersing the aqueous solution of water-soluble ethylenically unsaturated monomer (step (B)).

Then, after the atmosphere inside the system was fully replaced with nitrogen gas while the internal temperature of the round bottom flask containing the above emulsion was retained at 40° C., the round bottom flask was then heated in a water bath at 70° C. for 1 hour thereby performing a polymerization reaction (step (C)).

After the polymerization reaction, the reaction product was heated in an oil bath at 120° C., and subjected to azeotropic distillation thereby removing 114 g of water off the system while refluxing n-heptane to obtain a dehydrated polymer. 4.6 g of a 2% aqueous solution of ethylene glycol diglycidyl ether was added to the resultant dehydrated polymer as a post-crosslinking agent, and a post-crosslinking reaction was performed at 80° C. for 2 hours.

Then, the polymer was heated in the oil bath at 120° C. to remove n-heptane and water off the system by distillation, and dried under nitrogen atmosphere to obtain 94 g of a water-absorbent resin. The median particle size was 96 μm, the absorption capacity of physiological saline was 54 g/g, and the water content was 3% in the resultant water-absorbent resin.

Example 3

92.0 g of 80% by weight acrylic acid was placed in a 50 mL Erlenmeyer flask, and 102.2 g of 30% by weight sodium hydroxide was added dropwise into the flask with stirring while externally cooling the flask thereby performing neutralization. 0.11 g of potassium persulfate, 8.3 mg of ethylene glycol diglycidyl ether and 43.6 g of ion-exchanged water were added thereto to prepare an aqueous solution of water-soluble ethylenically unsaturated monomer.

334 g of n-heptane as a petroleum hydrocarbon dispersion medium, was placed in a 2 L five-neck cylindrical round bottom flask equipped with a stirrer, reflux condenser and nitrogen gas inlet tube, to which 0.92 g of maleic anhydride modified polyethylene (Mitsui Chemicals Inc., trade name: Hiwax 1105A) as a polymeric dispersion agent was added and dissolved under heat, followed by adding all of the aqueous solution of water-soluble ethylenically unsaturated monomer using a funnel, and the mixture was stirred at an internal temperature of 40° C. for 10 minutes (step (A)).

Next, 0.92 g of sucrose fatty acid ester (Mitsubishi-Kagaku Foods Corp., trade name: S-370) as a surfactant was dissolved in 8.28 g of n-heptane under heat, which was added to the above round bottom flask using a funnel thereby dispersing the aqueous solution of water-soluble ethylenically unsaturated monomer (step (B)).

Then, after the atmosphere inside the system was fully replaced with nitrogen gas while the internal temperature of the round bottom flask containing the above emulsion was retained at 40° C., the round bottom flask was then heated in a water bath at 70° C. for 1 hour thereby performing a polymerization reaction (step (C)).

After the polymerization reaction, 95 g of a water-absorbent resin was obtained in the same manner as in Example 2. The median particle size was 56 μm, the absorption capacity of physiological saline was 55 g/g, and the water content was 3% in the resultant water-absorbent resin.

Example 4

94 g of a water-absorbent resin was obtained in the same manner as in Example 3, except for using 0.92 g of oxidized polyethylene (Mitsui Chemicals Inc., trade name: Hiwax 4052E) instead of 0.92 g of maleic anhydride modified polyethylene as a polymeric dispersion agent. The median particle size was 60 μm, the absorption capacity of physiological saline was 56 g/g, and the water content was 2% in the resultant water-absorbent resin.

Example 5

96 g of a water-absorbent resin was obtained in the same manner as in Example 3, except for using 0.92 g of oxidized polyethylene (Mitsui Chemicals Inc., trade name: Hiwax 4052E) instead of 0.92 g of maleic anhydride modified polyethylene as a polymeric dispersion agent in the step (A), and adding a solution of 0.92 g of maleic anhydride modified polyethylene (Mitsui Chemicals Inc., trade name: Hiwax 1105A) dissolved in 8.28 g of n-heptane under heat, together with the surfactant, as the polymeric dispersion agent in the step (B). The median particle size was 63 μm, the absorption capacity of physiological saline was 56 g/g, and the water content was 2% in the resultant water-absorbent resin.

Example 6

95 g of a water-absorbent resin was obtained in the same manner as in Example 2, except for using a solution of 1.84 g of decaglyceryl pentastearate (Nikko Chemical Co. Ltd., trade name: Decaglyn 5-S) dissolved in 8.28 g of n-heptane under heat as a surfactant instead of 0.92 g of sucrose fatty acid ester in Example 3. The median particle size was 86 μm, the absorption capacity of physiological saline was 55 g/g, and the water content was 2% in the resultant water-absorbent resin.

Example 7

92.0 g of 80% by weight acrylic acid was placed in a 500 mL Erlenmeyer flask, and 102.2 g of 30% by weight sodium hydroxide was added dropwise into the flask with stirring while externally cooling the flask thereby performing neutralization. 0.11 g of potassium persulfate, 8.3 mg of N,N'-methylenebisacrylamide and 43.6 g of ion-exchanged water were added thereto to prepare an aqueous solution of water-soluble ethylenically unsaturated monomer.

352 g of cyclohexane as a petroleum hydrocarbon dispersion medium was place in a 2 L five-neck cylindrical round bottom flask equipped with a stirrer, reflux condenser and nitrogen gas inlet tube, to which 0.92 g of maleic anhydride modified polyethylene (Mitsui Chemicals Inc., trade name: Hiwax 1105A) as a polymeric dispersion agent was added and dissolved under heat, following by adding all of the aqueous solution of water-soluble ethylenically unsaturated monomer using a funnel, and the mixture was stirred at an internal temperature of 40° C. for 10 minutes (step (A)).

Next, 0.92 g of sucrose fatty acid ester (Mitsubishi-Kagaku Foods Corp., trade name: S-370) as a surfactant was dissolved in 8.28 g of cyclohexane under heat, which was added to the above round bottom flask using a funnel thereby dispersing the aqueous solution of water-soluble ethylenically unsaturated monomer (step (B)).

Then, after the atmosphere inside the system was fully replaced with nitrogen gas while the internal temperature of the round bottom flask containing the above emulsion was retained at 40° C., the round bottom flask was then heated in a water bath at 70° C. for 1 hour thereby performing a polymerization reaction (step (C)).

After the polymerization reaction, the reaction product was heated in an oil bath at 120° C., and subjected to azeotropic distillation thereby removing 114 g of water off the system while refluxing cyclohexane to obtain a dehydrated polymer. 4.6 g of a 2% aqueous solution of ethylene glycol diglycidyl ether as a crosslinking agent was added to the resultant dehydrated polymer, and a crosslinking reaction was performed at 75° C. for 2 hours.

Then, the polymer was heated in the oil bath at 120° C. to remove cyclohexane and water off the system by distillation, and dried under nitrogen atmosphere to obtain 97 g of a water-absorbent resin. The median particle size was 103 μm, the absorption capacity of physiological saline was 49 g/g, and the water content was 6% in the resultant water-absorbent resin.

Example 8

A polymerization reaction suspension that completed the polymerization reaction up to the step (C) in the same manner as in Example 3 was defined as the polymerization reaction suspension at the first stage, and the temperature was cooled at 25° C.

Separately, 128.8 g of 80% by weight acrylic acid was placed in a 500 mL Erlenmeyer flask, and 142.9 g of 30% by weight sodium hydroxide was added dropwise into the flask with stirring while externally cooling the flask thereby performing neutralization. 0.15 g of potassium persulfate, 11.6 mg of ethylene glycol diglycidyl ether and 16.7 g of distilled water were added thereto to prepare an aqueous solution of water-soluble ethylenically unsaturated monomer at the second stage.

After the aqueous monomer solution at the second stage was added to the above polymerization reaction suspension at the first stage and the atmosphere inside the system was replaced with nitrogen gas, the system was heated in a water bath at 70° C. for 1 hour thereby performing the reversed-phase suspension polymerization at the second stage.

After the polymerization reaction, the reaction product was heated in an oil bath at 120° C., and subjected to azeotropic distillation thereby removing 255 g of water off the system while refluxing n-heptane in the round bottom flask to obtain a dehydrated polymer. 8.2 g of a 2% aqueous solution of ethylene glycol diglycidyl ether as a crosslinking agent was added to the resultant dehydrated polymer, and the crosslinking reaction was performed at 80° C. for 2 hours.

Then, the reaction mixture was heated in the oil bath at 120° C. to remove n-heptane and water off the system by distillation, and dried under nitrogen atmosphere to obtain 232 g of a water-absorbent resin in a form of agglomerated spherical particles. The median particle size was 335 μm, the absorption capacity of physiological saline was 53 g/g, and the water content was 3% in the resultant water-absorbent resin.

Comparative Example 1

92.0 g of 80% by weight acrylic acid was placed in a 500 mL Erlenmeyer flask, and 102.2 g of 30% by weight sodium hydroxide was added dropwise into the flask with stirring while externally cooling the flask thereby performing neutralization. 0.11 g of potassium persulfate, 8.3 mg of ethylene glycol diglycidyl ether and 43.6 g of ion-exchanged water were added thereto to prepare an aqueous solution of water-soluble ethylenically unsaturated monomer.

342 g of n-heptane as a petroleum hydrocarbon dispersion medium was placed in a 2 L five-neck cylindrical round bottom flask equipped with a stirrer, reflux condenser and nitrogen gas inlet tube, to which 0.92 g of sucrose fatty acid ester (Mitsubishi-Kagaku Foods Corp., trade name: S-370) as a surfactant and 0.92 g of maleic anhydride modified polyethylene (Mitsui Chemicals Inc., trade name: Hiwax 1105A) as a polymeric dispersion agent were added and dissolved under heat at internal temperature of 80° C., and then all of the above aqueous solution of water-soluble ethylenically unsaturated monomer was added to the dispersion medium in the presence of the surfactant using a funnel, the atmosphere in the system was fully replaced with nitrogen gas while retaining the internal temperature of the round bottom flask containing the above emulsion at 40° C., and the emulsion was heated in a water bath at 70° C. for 1 hour to perform a polymerization reaction.

After the polymerization reaction, 95 g of a water-absorbent resin was obtained in the same manner as in Example 2. The median particle size was 59 μm, the absorption capacity of physiological saline was 52 g/g, and the water content was 2% in the resultant water-absorbent resin.

Comparative Example 2

97 g of a water-absorbent resin was obtained in the same manner as in Comparative Example 1, except for using 1.84 g of decaglyceryl pentastearate (Nikko Chemical Co. Ltd., trade name: Decaglyn 5-S) as a surfactant instead of 0.92 g of sucrose fatty acid ester. The median particle size was 90 μm, the absorption capacity of physiological saline was 52 g/g, and the water content was 3% in the resultant water-absorbent resin.

Comparative Example 3

The water-absorbent resin prepared in the same manner as in Comparative Example 2 was uniformly spread in a stainless plate, and heated by a hot air drier at 180° C. for 3 hours. The median particle size was 89 µm, the absorption capacity of physiological saline was 55 g/g, and the water content was 0% in the resultant water-absorbent resin.

Comparative Example 4

92.0 g of 80% by weight acrylic acid was placed in a 500 mL Erlenmeyer flask, and 102.2 g of 30% by weight sodium hydroxide was added dropwise into the flask with stirring while externally cooling the flask thereby performing neutralization. 0.11 g of potassium persulfate, 8.3 mg of N,N'-methylenebisacrylamide and 43.6 g of ion-exchanged water were added thereto to prepare an aqueous solution of water-soluble ethylenically unsaturated monomer.

360 g of cyclohexane as a petroleum hydrocarbon dispersion medium was placed in a 2 L five-neck cylindrical round bottom flask equipped with a stirrer, reflux condenser and nitrogen gas inlet tube, to which 0.92 g of sucrose fatty acid ester (Mitsubishi-Kagaku Foods Corp., trade name: S-370) as a surfactant and 0.92 g of maleic anhydride modified polyethylene (Mitsui Chemicals Inc., trade name: Hiwax 1105A) as a polymeric dispersion agent were added and dissolved under heat, and then all of the above aqueous solution of water-soluble ethylenically unsaturated monomer was added to the dispersion medium in the presence of the surfactant using a funnel, the atmosphere in the system was fully replaced with nitrogen gas while retaining the internal temperature at 40° C., and then the emulsion was heated in a water bath at 70° C. for 1 hour thereby performing a polymerization reaction.

After the polymerization reaction, 96 g of a water-absorbent resin was obtained in the same manner as in Example 7. The median particle size was 110 µm, the absorption capacity of physiological saline was 48 g/g, and the water content was 7% in the resultant water-absorbent resin.

The median particle size, water content and odor sensory test of the water-absorbent resins prepared in the respective Examples and Comparative Examples were evaluated by the methods illustrated below.

(Median Particle Size)

50 g of the water-absorbent resin was sieved with a JIS standard sieve with a sieve opening of 250 µm. The median particle size was measured using a combination of sieves (A) when 50% by weight or more of the resin passed through the sieve opening, while using a combination of sieves (B) when 50% by weight or more of the resin remained on the sieve.

(A) JIS standard sieves were stacked downward as follows; beginning with a sieve with a sieve opening of 425 µm at the top, followed by a sieve with a sieve opening of 250 µm, a sieve with a sieve opening of 180 µm, a sieve with a sieve opening of 150 µm, a sieve with a sieve opening of 106 µm, a sieve with a sieve opening of 75 µm, a sieve with a sieve opening of 45 µm and a tray in order.

(B) JIS standard sieves were stacked downward as follows; beginning with a sieve with a sieve opening of 850 µm at the top, followed by a sieve with a sieve opening of 600 µm, a sieve with a sieve opening of 500 µm, a sieve with a sieve opening of 425 µm, a sieve with a sieve opening of 300 µm, a sieve with a sieve opening of 250 µm, a sieve with a sieve opening of 150 µm and a tray in order.

About 50 g of the water-absorbent resin was placed on the sieve at the top, and classified for 20 minutes using a low tap-type shaking machine.

After the sieve classification, the weight of the water-absorbent resin remaining on the respective sieves was calculated in terms of weight percent based on the total weight of resin, the values were integrated in order from the resins with a smaller particle size, and thereby the relations between the sieve openings and integration values of the weight percentage of the water-absorbent resin remaining on the sieve were plotted on a logarithmic-probability paper. The plots on the probability paper were connected with a straight line, and the particle size corresponding to integrated weight percent of 50% by weight was defined as the median particle size.

(Water Content)

About 2.5 g of the water-absorbent resin was weighed accurately (Xg), and after drying at 105° C. with a hot air drier for 2 hours, the weight of the dried water-absorbent resin was measured (Yg), and then the water content was calculated by the following equation.

Water content(%)=[(X−Y)/X]×100

(Absorption Capacity of Physiological Saline)

500 g of a 0.9% aqueous solution of sodium chloride was placed in a 500 mL beaker with a 3 cm-long bar and while stirring with a magnetic stirrer, 2.0 g of the water-absorbent resin was weighed accurately (Ag) and added to the beaker such that no unswollen lump is left, and then the mixture was stirred at a rate of 600 rpm for 1 hour.

Gel was filtered out by a JIS standard sieve which is 20 cm in diameter with a sieve opening of 38 µm, excessive water contained in the gel remaining on the sieve was roughly drained with a fluorine resin board, and then the sieve was tilted and left for 30 minutes for further draining. The weight of the gel remaining on the sieve (Bg) was weighed, and the absorption capacity of physiological saline was calculated by the following equation.

Absorption capacity of physiological saline(g/g)=B/A (Odor Sensory Test)

Odor of the water-absorbent resin originating from the dispersion medium upon swelling was compared by the following method. 20.0 g of 0.9% by mass saline at 25° C. was placed in a 140 mL glass bottle with a lid (mayonnaise bottle), and stirred with a 3 cm-long bar. 4.0 g of the water-absorbent resin was added to the glass bottle and tightly sealed. The odor originating from the dispersion medium in the glass bottle was determined by five panelists in accordance with the six-level odor intensity indication method shown below, and evaluated by the mean value.

TABLE 1

| Six-level evaluation | Evaluation criteria |
| --- | --- |
| 5 | Very strong odor |
| 4 | Strong odor |
| 3 | Easily recognized odor |
| 2 | Slight odor, oder of what is recognized |
| 1 | Very slight odor which is detected with difficulty |
| 0 | No odor |

The odor sensory test results of the water-absorbent resin prepared in Examples 1 to 8 and Comparative Examples 1 to 4 are shown in Table 2.

TABLE 2

| Sample | Dispersion medium | Median particle size [μm] | Absorption capacity of physiological saline [g/g] | A | B | C | D | E | Average |
|---|---|---|---|---|---|---|---|---|---|
| Example 1 | Heptane | 127 | 60 | 2 | 2 | 2 | 2 | 1 | 1.8 |
| Example 2 | Heptane | 96 | 54 | 1 | 1 | 1 | 1 | 1 | 1.0 |
| Example 3 | Heptane | 56 | 55 | 1 | 1 | 0 | 0 | 0 | 0.4 |
| Example 4 | Heptane | 60 | 56 | 1 | 0 | 0 | 0 | 0 | 0.2 |
| Example 5 | Heptane | 63 | 56 | 1 | 0 | 0 | 0 | 0 | 0.2 |
| Example 6 | Heptane | 86 | 55 | 1 | 1 | 1 | 1 | 0 | 0.8 |
| Example 7 | Cyclohexane | 103 | 49 | 2 | 2 | 2 | 2 | 1 | 1.8 |
| Example 8 | Heptane | 335 | 53 | 0 | 0 | 0 | 0 | 0 | 0.0 |
| Comparative Example 1 | Heptane | 59 | 52 | 3 | 3 | 3 | 3 | 3 | 3.0 |
| Comparative Example 2 | Heptane | 90 | 52 | 3 | 3 | 3 | 3 | 3 | 3.0 |
| Comparative Example 3 | Heptane | 89 | 55 | 3 | 3 | 3 | 3 | 3 | 3.0 |
| Comparative Example 4 | Cyclohexane | 110 | 48 | 4 | 4 | 4 | 4 | 4 | 4.0 |

As is shown in Table 2, it is obvious that odor originating from the dispersion medium of the water-absorbent resin prepared by the production process of the present invention is lower, in the comparisons among the same kind of dispersion media.

The invention claimed is:

1. A process for production of a water-absorbent resin by subjecting a water-soluble ethylenically unsaturated monomer to reversed-phase suspension polymerization, comprising the following steps of:
    (A) adding an aqueous solution of water-soluble ethylenically unsaturated monomer to a petroleum hydrocarbon dispersion medium to disperse the aqueous solution in the dispersion medium,
    (B) adding a surfactant to the emulsion to further disperse the monomer in the emulsion, and
    (C) performing the reversed-phase suspension polymerization using a water-soluble radical polymerization initiator optionally in the presence of an internal-crosslinking agent,
    wherein the surfactant is selected from the group consisting of sorbitan fatty acid ester, polyglycerin fatty acid ester, sucrose fatty acid ester, and combinations thereof,
    wherein the petroleum hydrocarbon dispersion medium is selected from the group consisting of aliphatic hydrocarbons, alicyclic hydrocarbons having 6 to 7 carbon atoms, and a mixture thereof,
    wherein the aqueous solution of ethylenically unsaturated monomer is added to and dispersed in the petroleum hydrocarbon dispersion medium in the presence of a polymeric dispersion agent in the step (A), and
    wherein the polymeric dispersion agent is selected from the group consisting of maleic anhydride modified polyethylene, maleic anhydride modified polypropylene, maleic anhydride modified ethylene-propylene copolymer, oxidized polyethylene, oxidized polypropylene, and combinations thereof.

2. The process for production of a water-absorbent resin according to claim 1, wherein a polymeric dispersion agent is further added together with the surfactant in the step (B); and the polymeric dispersion agent is at least one selected from the group consisting of maleic anhydride modified polyethylene, maleic anhydride modified polypropylene, maleic anhydride modified ethylene-propylene copolymer, maleic anhydride-ethylene copolymer, maleic anhydride-propylene copolymer, maleic anhydride-ethylene-propylene copolymer, polyethylene, polypropylene, ethylene-propylene copolymer, oxidized polyethylene and oxidized polypropylene.

3. The process for production of a water-absorbent resin according to claim 1, wherein the water-absorbent resin prepared by the steps (A) through (C) is subjected to post-crosslinking using a post-crosslinking agent.

4. The process for production of a water-absorbent resin according to claim 1, wherein the water-soluble ethylenically unsaturated monomer is at least one selected from the group consisting of acrylic acid and salts thereof, methacrylic acid and salts thereof, and acrylamide.

* * * * *